United States Patent [19]

Sun

[11] Patent Number: 5,062,198

[45] Date of Patent: Nov. 5, 1991

[54] METHOD OF MAKING A TRANSPARENT TOUCH SCREEN SWITCH ASSEMBLY

[75] Inventor: Brian Y. Sun, Garland, Tex.

[73] Assignee: Keytec, Inc., Richardson, Tex.

[21] Appl. No.: 520,232

[22] Filed: May 8, 1990

[51] Int. Cl.⁵ .......................................... H01H 11/04
[52] U.S. Cl. ..................................... 29/622; 129/846; 156/291; 156/292; 427/110
[58] Field of Search ..................... 29/622, 846, 847; 200/86 R, 5 A; 156/276, 291, 292; 340/665, 666; 341/34; 427/110

[56] References Cited

U.S. PATENT DOCUMENTS

| | | | |
|---|---|---|---|
| 3,668,337 | 6/1972 | Sinclair | 200/86 R |
| 3,764,486 | 10/1973 | Tinklenberg et al. | 29/846 |
| 4,017,697 | 4/1977 | Larson | 200/5 |
| 4,017,848 | 4/1977 | Tannas, Jr. | 341/34 |
| 4,431,882 | 2/1984 | Frame | 200/5 |
| 4,574,438 | 3/1986 | Diepers et al. | 29/25.35 |
| 4,700,025 | 10/1987 | Hatayama et al. | 200/5 |
| 4,786,767 | 11/1988 | Kuhlman | 200/5 A |
| 4,864,084 | 9/1989 | Cardinale | 200/5 |
| 4,965,421 | 10/1990 | Epperson | 200/5 A |

Primary Examiner—P. W. Echols
Attorney, Agent, or Firm—Dennis T. Griggs

[57] ABSTRACT

A touch-sensitive matrix switch assembly includes a pair of transparent insulating substrates having conductive row strips and column strips. The conductive row strips and column strips are separated by longitudinal extending channels, and an insulating spacer strip is deposited in each row channel and in each column channel. The substrates are mounted together with the row conductors extending transversely with respect to the column conductors. An air gap between the row conductors and column conductors is provided by the engagement of the row spacer strips against the column spacer strips. The space strips are formed by very small diameter transparent glass or polymer particles which are mixed with a transparent polymer adhesive in a volatile solvent. The glass or polymer particle/adhesive mixture is sprayed into the channels through a mask to produce a transparent, non-conductive glass or polymer deposit which is enlarged slightly out of the channel, thereby defining a spacer strip. In an analog touch switch assembly, spacer dots are applied onto the surface of a resistive sheet by pneumatically sputtering small diameter transparent glass or polymer particles which are coated by a transparent polymer adhesive.

3 Claims, 2 Drawing Sheets

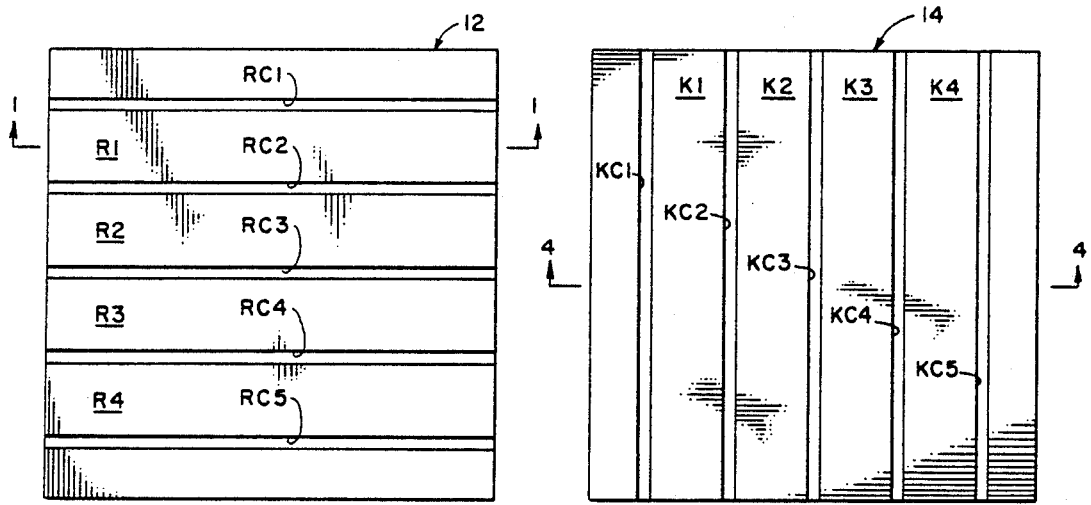
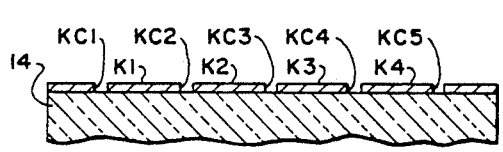
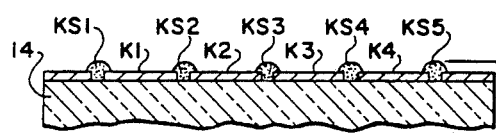
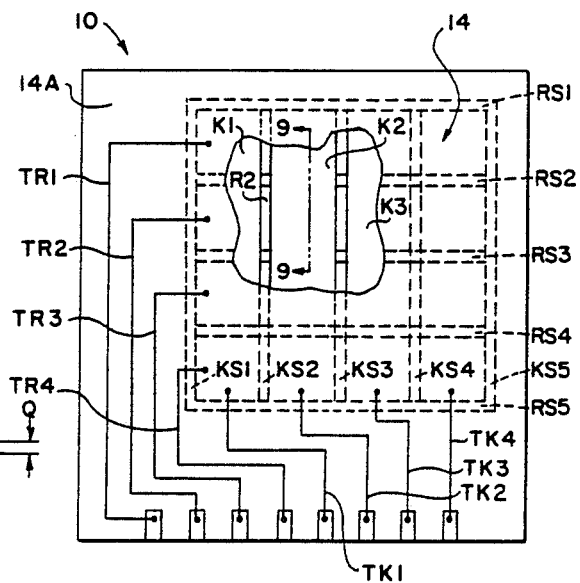

METHOD OF MAKING A TRANSPARENT TOUCH SCREEN SWITCH ASSEMBLY

FIELD OF THE INVENTION

This invention relates generally to electrical switches, and in particular to a transparent, flexible membrane switch assembly which can be implemented in a matrix array.

BACKGROUND OF THE INVENTION

Membrane touch switch panels generally include a pair of circuit substrates, one fixed and one movable, which are separated by insulating spacer elements. The circuit substrates are sheets of insulating material on which a conductive circuit pattern is bonded. In analog touch switch panels, the circuit pattern is a continuous layer of resistive material. In matrix switch assemblies, the circuit patterns are conductive strips or pads which are separated by spacer elements. Switch closure is produced by applying finger or stylus pressure to a specific location on the movable substrate to deflect the movable contact element into electrical engagement against the underlying fixed contact element. Such membrane touch switch panels are essentially two-dimensional and have a thickness of less than a millimeter and a length and width of several inches. Such panels are generally formed in a laminated construction with the layers bonded together. The membrane assembly may include an overlay sheet on which graphics or alphanumeric characters are printed, an electromagnetic interference (EMI) shield layer and a back support plate.

DESCRIPTION OF THE PRIOR ART

Membrane touch panels are subject to warping caused by thermal cycling and by stress forces. Such warping may cause a circuit element to inadvertently make closed circuit contact and thereby produce a false actuation. Various spacer element configurations have been employed to minimize the effects of such warping and stress forces.

In both the matrix switch array and the analog switch assembly, layer separation has been provided by small spheres of polymer material, spacer disks, elastomeric pads, elastomeric buttons, perforated spacer sheets, and the like.

A limitation on the use of such spacer elements in transparent touch screens of the type noted above is that they are visible within the transparent field of view. Such spacer elements are distracting to the user, and interfere with the presentation of symbols, graphics and alphanumeric information which may be printed on an overlay sheet.

It is also desirable in a membrane touch panel switch assembly to reliably produce switch actuation in response to a predetermined level of finger pressure, while minimizing false actuations. Efforts to reduce the size and number of spacer elements to minimize their interference within the visual field have generally increased touch sensitivity, but have increased the possibility of false actuations due to inadvertent finger contact.

Examples of switch assemblies having membrane touch panels are disclosed in the following U.S. Pat. Nos.:
3,617,666; 3,668,337; 3,722,086
3,798,370; 3,911,215; 4,017,697
4,431,882; 4,471,177; 4,700,025
4,786,767; 4,818,827; 4,864,084

SUMMARY OF THE INVENTION

Accordingly, there is a continuing interest in providing a transparent touch screen switch assembly in which the spacer elements are transparent and do not interfere with presentation of data within the visual field, and in which switch actuation is substantially non-responsive to finger pressure below a predetermined threshold level.

In accordance with the present invention, the foregoing objects are provided by a touch-sensitive switch assembly in which a pair of insulating substrates have conductive row strips and column strips formed thereon, respectively, with the row strips being separated by longitudinally extending channels, and with the conductive column strips being separated by longitudinally extending channels. An insulating spacer strip is formed in each row channel and in each column channel. The substrates are mounted together with the row conductors extending transversely with respect to the column conductors, and with the row spacer strips engaging the column spacer strips, thereby defining an air gap between the row conductors and the column conductors. A matrix of single pole switches is produced at the regions of overlap between the row conductors and the column conductors. Switch closure is produced by applying finger pressure to the external surface of one of the insulating substrates in a rectangular region which is bounded by the transversely extending row and column spacer strips.

In the preferred embodiment, the insulating substrates are fabricated from a transparent polymer membrane. The conductive strips are formed by depositing a transparent, conductive layer of a metal oxide on each membrane, and then etching the conductive layer to form longitudinal channels between conductive row and column strips. The spacer strips are preferably formed by very small diameter (45 microns or less) transparent glass or polymer particles which are mixed with a transparent polymer adhesive in a volatile solvent. The glass or polymer particle/adhesive mixture is sprayed into the channels through a mask to produce a transparent, non-conductive polymer deposit which is enlarged slightly out of the channel, thereby defining a spacer strip.

When finger pressure is applied onto the top substrate membrane, the conductive column (or row) strip deflects inwardly and establishes electrical contact with the underlying conductive row (or column) strip. The switch actuation pressure threshold is reliably established by selection of the thickness of the movable switch substrate, by the size of the spacer strips and by the lateral spacing between adjacent row spacer strips and between adjacent column spacer strips. A conductive input/output trace is connected to the end portion of each row conductor and column conductor for connection to external circuitry.

The novel features of the invention are set forth with particularity in the claims. The invention will best be understood from the following description when read in conjunction with the accompanying drawings.

BRIEF DESCRIPTION OF THE DRAWINGS

FIG. 1 is a sectional view of an insulating substrate having a transparent, conductive deposit formed thereon;

FIG. 2 is a top plan view of an insulating substrate having a plurality of conductive row strips formed thereon, with the conductive row strips being separated by longitudinally extending channels FIG. 3 is a top plan view of an insulating substrate having conductive column strips formed thereon, with the conductive column strips being separated by channels which extend transversely with respect to the row channels;

FIG. 4 is a sectional view of a column strip substrate taken along the lines 4—4 of FIG. 3;

FIG. 5 is a view similar to FIG. 4, with insulating spacer strips being deposited within the column separation channels;

FIG. 6 is a top plan view, partially broken away, of a touch-sensitive switch assembly formed by mounting the row strip substrate of FIG. 2 onto the column strip substrate of FIGURE 3, with the row conductors and column conductors being separated by row and column spacer strips;

DETAILED DESCRIPTION OF THE PREFERRED EMBODIMENTS

Figure 7:
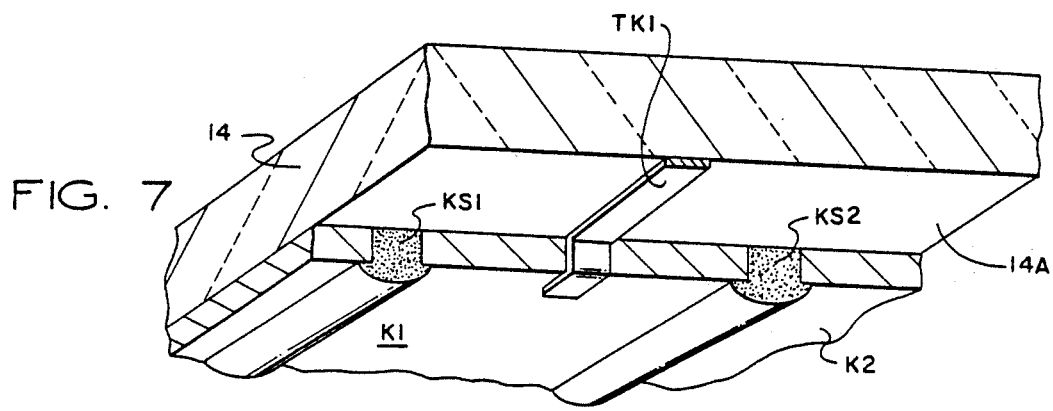
FIG. 7 is a perspective view, partially broken away, of the column strip substrate.

In the description which follows, like parts are marked throughout the specification and drawings with the same reference numerals, respectively. The drawings are not necessarily to scale, and the proportions of certain parts have been exaggerated to better illustrate details and features of the invention.

Referring now to FIGS. 1-9, a flexible membrane switch assembly 10 is implemented in a matrix array and includes a pair of circuit substrates 12, 14. The circuit substrates 12, 14 are sheets of insulating polymer material on which conductive strips are bonded. In this embodiment, the lower substrate 12 is referred to as the base substrate, which is mountable onto a back support plate (not illustrated). The top substrate 14 is a flexible, resilient membrane sheet, referred to herein as the actuating membrane.

The base substrate 12 has conductive row strips R1, R2, R3 and R4 formed thereon. The row strips are separated by longitudinally extending channels RC1, RC2, RC3, RC4 and RC5. Likewise, the top substrate 14 has conductive column strips K1, K2, K3 and K4 formed thereon, with the column strips being separated by longitudinally extending channels KC1, KC2, KC3, KC4 and KC5.

The lower and upper substrates 12, 14 are prepared by depositing a conductive coating, for example indium tin oxide (ITO), on one major side surface of each substrate. The row and column strips are defined by etching horizontal and vertical grid channels through the indium tin oxide layers. Preferably, the indium tin oxide layer has a thickness of 200 angstroms and a resistivity of 200 ohms per square. At that thickness, the indium tin oxide layer is optically transparent.

The substrates 10, 12 are preferably made of a polymer such as polyester (PET) resin. Other transparent polymers which may be used for fabricating the substrates 10, 12 include polycarbonate, polysulfone, polyethersulfone, acrylic, polyacrylonitrile, cellulose propionate, ethyl cellulose and polyimide. The substrate 12 can also be made of glass.

The polymers which are preferred for use in the foregoing construction are amorphous (non-crystalline) or semi-crystalline with the following properties:

1) A glass transition point and/or melting point of 80° C. or higher with no secondary transitions between −50° C. and +80° C. to allow for operation and storage without material failure under ambient atmospheric conditions.

2) The coefficient of thermal expansion of the polymer film or sheet is matched with the conductive row and column strip material so that delamination does not occur.

3) Transparency is obtained by using a polymer the chemical repeating units of which do not interact with visible light (i.e., one that does not contain significant amounts of carbon-carbon, carbon-oxygen, carbon-sulfur or sulfur-oxygen double bonds).

According to an important feature of the invention, insulating spacer strips are formed in each row channel and in each column channel. The row spacer strips are indicated as follows: RS1, RS2, RS3, RS4 and RS5. The column spacer strips are indicated as follows: KS1, KS2, KS3, KS4 and KS5.

The insulating spacer strips are preferably formed of a non-conductive glass or polymer particle/adhesive mixture which is sprayed into the channels through a nozzle so that the particle deposit is enlarged slightly out of the channel (see FIG. 5), thereby forming a spacer strip. The non-conductive glass or polymer particles are preferably transparent glass or polymer particles having an average length of 45 microns or less. The transparent particles are uniformly mixed within a polymer adhesive such as acrylic, polyvinyl acetate, polyurethane, epoxy, etc., with the adhesive being mixed with a volatile solvent such as toluene, alcohol, freon, etc. Preferably, the adhesive is an acrylic base adhesive, and the solvent is added in proportion sufficient to reduce the viscosity of the mixture so that it can be discharged by air pressure at 10-15 psi through a 20 mil diameter nozzle. The adhesive glass or polymer particle spray mixture is applied through a mask or template into the row channels and column channels.

The thickness Q (FIG. 5) of the row spacer strips and the column spacer strips is about 1 mil as measured with reference to the external surface of the conductive row and column strips. When the substrates 12 and 14 are superimposed with the row spacer strips engaging the column spacer strips, an air gap G (FIG. 9) of about 2 mils is produced between the conducting row and column strips.

Referring to FIG. 6, the base and top substrates 12, 14, when superimposed with the column spacer strips engaging the row spacer strips, provide a 4×4 matrix of touch switches. The sensitivity of the switch assembly 10, that is the minimum pressure required to deflect the top membrane 14 sufficiently to displace a column conductor into electrical contact against a row conductor, will increase as the spacer strip thickness Q is decreased, and will decrease as the rectangular actuation area defined by the overlapping row and column conductor strips is increased. The threshold pressure required to bridge the row and column conductors into electrical contacting engagement also depends upon the resiliency of the top actuating membrane.

Figure 9:
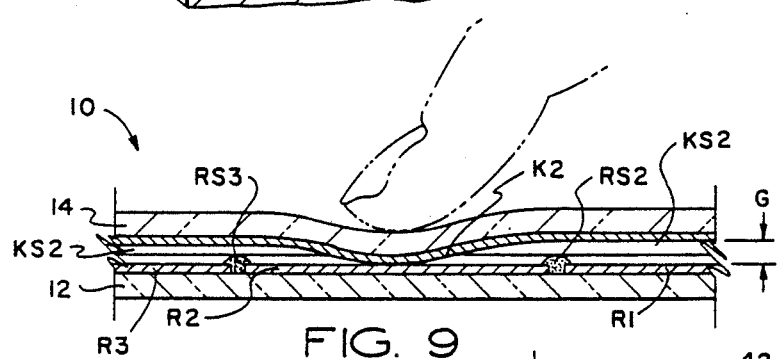
FIG. 9 is a sectional view taken along the lines 9—9 of FIG. 6.

The width of the row and column conductor strips can be adjusted to accommodate finger actuation as shown in FIG. 9, or can be moved closer together for greater resolution and actuation by a stylus. As shown in FIG. 9, the row and column spacer strips maintain an air gap G between the row conductors and column conductors and prevent switch actuation which might be caused by inadvertent sliding finger contact, while providing positive switch actuation in response to direct finger pressure in a rectangular actuation region which is bounded by the transversely extending row and column spacer strips.

Figure 8:
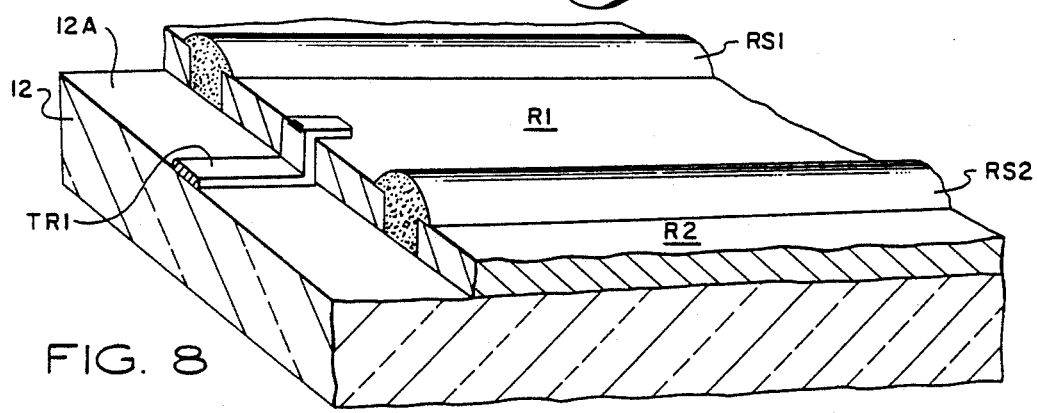
FIG. 8 is a perspective view, partially broken away, of the row strip substrate.

Referring now to FIGS. 6, 7 and 8, conductive input-/output traces TR1, TR2, TR3 and TR4 are electrically connected to the conductive row strips R1, R2, R3, R4, respectively. The conductive traces TR1-TR4 and TK1-TK4 are attached to the terminal end portions of the row conductors and column conductors, outside of the field of view. The conductive traces can be formed by thermal sputter deposit, vacuum deposit or by application of conductive paint through a screen or template. Preferably, the conductive traces are integrally formed with the indium tin oxide deposits which form the row conductors and column conductors, and are selectively etched to produce the desired interconnect pattern, for example, as shown in FIG. 6. The traces TR1-TR4 are bonded onto and routed along marginal surface portions 12A, 14A of the base substrate 12 and top substrate 14, respectively.

Referring again to FIG. 9, when it is desired to actuate a particular switch, for example the switch defined at the overlap actuation region between column conductor K2 and row conductor R2, an actuation force is applied against the top membrane 14 in the rectangular overlap region bounded by the row spacer strips RS2, RS3 and column spacer strips KS2, KS3. The finger pressure causes inward deflection of the top substrate membrane 14, thereby driving the column conductor K2 into electrical contacting engagement with the row conductor R2, thus establishing a closed circuit between conductive input/output traces TR2, TK2. Upon release of finger pressure, the electrical circuit is opened as the resilient top substrate membrane 14 automatically retracts to its unstressed position.

Figure 10:
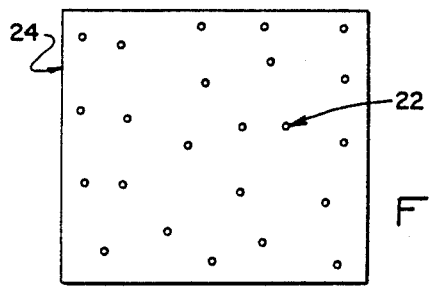
FIG. 10 is a top plan view of an analog touch panel having spacer dots randomly distributed over the surface of a resistive substrate.
Figure 12:
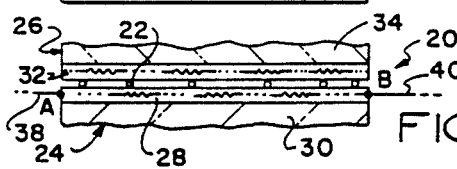
FIG. 12 is a sectional view of the analog touch switch assembly taken along the lines 12—12 of FIG. 11.
Figure 11:
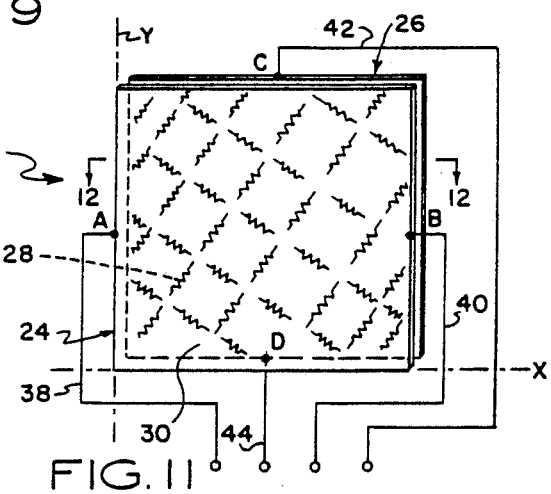
FIG. 11 is a perspective view showing the assembly of first and second resistive membranes in an analog touch switch panel.

Referring now to FIGS. 10, 11 and 12, an analog touch switch assembly 20 utilizes spacer dots 22 which are applied onto the surface of a sheet of resistive material 24 by pneumatically spraying or sputtering small diameter transparent glass or polymer particles which are coated by a transparent polymer adhesive. Preferably, the polymer adhesive is an acrylic based adhesive, and a solvent such as toluene is added in proportion sufficient to reduce the viscosity of the mixture so that it can be sputtered by air pressure through a small diameter nozzle. The glass or polymer particles are transparent, and have an average length of 45 microns or less. The glass or polymer particle concentration within the adhesive solution is selected to provide a random spacing of the particles at about ¼ to ½ inch when sputtered or sprayed through a 20 mil diameter nozzle by air pressure at 10-15 psi.

The resistive sheet 24 is the base substrate, and is constructed by depositing a resistive layer 28 onto a side surface of a polymer substrate 30. Preferably, the resistive layer 28 has a substantially uniform resistance of about 200-2,000 ohms per square. The upper resistance sheet 26 is formed in a like manner, by depositing a resistive layer 32 on a transparent polymer substrate 34. After the transparent glass or polymer dots 22 have been sputtered onto the base resistance sheet 24, the top resistance sheet 26 is assembled onto the base resistance sheet 24, as shown in FIGS. 11 and 12. Input/output conductors 38, 40 are electrically connected at resistance nodes A, B on base sheet 24, and input/output conductors 42, 44 are electrically connected to resistance nodes C, D on the top resistance sheet 26. According to this arrangement, unique resistance values are produced between the input/output conductors which are proportional to a physical point on a planar coordinate system. The resistance values are produced by depressing the top resistance sheet 26 against the base resistance sheet at a selected X-Y coordinate location, by stylus or finger pressure.

According to the foregoing method, the transparent, nonconductive spacer dots 22 are coated with adhesive and are pneumatically sputtered discretely in a random distribution across the surface of the resistance layer 28 on the base sheet 24. The effective density of the transparent spacer dots 22 is controlled by adjusting the air pressure, the distance between the nozzle and the resistive substrate surface, particle concentration and discharge nozzle diameter. By this method, only a small region of the underlying resistance sheet is contacted by the polymer adhesive which bonds each spacer dot onto the resistive sheet. Consequently, substantially all of the resistive surface areas of the two resistive sheets are available to make contact between the spacer dots 22.

The switch coordinate resolution can be adjusted, as desired, by increasing or decreasing the spacer dot density. X-Y switch coordinate resolution on the order of 0.05 mm can be provided, if desired. Moreover, X-Y matrix switch resolution comparable to the matrix switch assembly 10 can be produced merely by increasing the random spacing distance between the spacer dots 22. Because of the extremely small size of the transparent spacer dots 22, the spacer dots do not interfere with the presentation of data within the visual field.

What is claimed is:
1. A method for making a touch-sensitive switch assembly comprising:
forming a plurality of conductive row strips on a side surface of an insulating substrate, with each pair of adjacent row strips being separated by a longitudinally extending row channel, respectively;
forming a plurality of conductive column strips on a side surface of an insulating substrate, with each pair of adjacent column strips being separated by a longitudinally extending column channel, respectively;
filling each row channel with an insulating deposit until the deposit is enlarged slightly out of the channel, thereby forming a row spacer strip;
filling each column channel with an insulating deposit until the deposit is enlarged slightly out of the channel, thereby forming a column spacer strip; and,
mounting the first insulating substrate onto the second insulating substrate with the row conductors extending transversely with respect to the column conductors and with the row spacer strips engaging the column spacer strips, thereby defining an air gap between the row conductors and the column conductors;

2. A method for making a touch-sensitive switch assembly as defined in claim 1, wherein the filling steps are performed by spraying a mixture of non-conductive particles and adhesive liquid solution through a nozzle into the row and column channels, respectively.

3. A method for manufacturing a touch-sensitive switch assembly as defined in claim 2, wherein the non-conductive particles are transparent polymer particles having an average length of 45 microns or less, and the transparent polymer particles are uniformly mixed in the adhesive liquid solution and are discharged by air pressure at 10–15 psi through a 20 mil diameter nozzle.

* * * * *

UNITED STATES PATENT AND TRADEMARK OFFICE
CERTIFICATE OF CORRECTION

PATENT NO. : 5,062,198
DATED : November 5, 1991
INVENTOR(S) : Brian Y. Sun It is certified that error appears in the above-identified patent and that said Letters Patent is hereby corrected as shown below:

Title Page:
In the Abstract

Line 12, "The space strips" should be -- The spacer strips --.

Column 3, line 4, "channels" should be -- channels; --.

Column 7, line 2, "conductors;" should be -- conductors. --.

Signed and Sealed this

Second Day of March, 1993

Attest:

STEPHEN G. KUNIN

Attesting Officer     Acting Commissioner of Patents and Trademarks